(12) United States Patent
Christensen et al.

(10) Patent No.: US 10,033,036 B2
(45) Date of Patent: Jul. 24, 2018

(54) METAL/OXYGEN BATTERY WITH INTERNAL OXYGEN RESERVOIR

(71) Applicant: Robert Bosch GmbH, Stuttgart (DE)

(72) Inventors: John F. Christensen, Mountain View, CA (US); Timm Lohmann, Mountain View, CA (US); Paul Albertus, Mountain View, CA (US); Boris Kozinsky, Waban, MA (US); Roel Sanchez-Carrera, Sommerville, MA (US); Aleksandar Kojic, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 1222 days.

(21) Appl. No.: 13/803,197

(22) Filed: Mar. 14, 2013

(65) Prior Publication Data

US 2013/0330630 A1 Dec. 12, 2013

Related U.S. Application Data

(60) Provisional application No. 61/656,862, filed on Jun. 7, 2012, provisional application No. 61/664,265, filed
(Continued)

(51) Int. Cl.
*H01M 4/485* (2010.01)
*H01M 4/48* (2010.01)
(Continued)

(52) U.S. Cl.
CPC ............. *H01M 4/485* (2013.01); *H01M 4/13* (2013.01); *H01M 4/366* (2013.01); *H01M 4/382* (2013.01);
(Continued)

(58) Field of Classification Search
None
See application file for complete search history.

(56) References Cited

U.S. PATENT DOCUMENTS

| | | | |
|---|---|---|---|
| 2010/0176767 A1* | 7/2010 | Long | H01M 4/133 320/137 |
| 2011/0104553 A1 | 5/2011 | Pol et al. | |

(Continued)

FOREIGN PATENT DOCUMENTS

| | | |
|---|---|---|
| WO | 2009105863 A1 | 9/2009 |
| WO | WO 2011112992 A1 * | 9/2011 |

OTHER PUBLICATIONS

Kraytsberg et al. Review on Li—air batteries—Opportunities, limitations and perspective, Journal of Power Sources 196 (2011) 886-893; 8 pages total.*
(Continued)

*Primary Examiner* — Ula C Ruddock
*Assistant Examiner* — Anna Korovina
(74) *Attorney, Agent, or Firm* — Maginot Moore & Beck LLP (57) ABSTRACT

An electrochemical cell in one embodiment includes a negative electrode, a positive electrode spaced apart from the negative electrode, a separator positioned between the negative electrode and the positive electrode; and an active material particle within the positive electrode, the active material particle including an outer shell defining a core with a substantially constant volume and including a form of oxygen, the outer shell substantially impervious to oxygen and pervious to lithium.

14 Claims, 5 Drawing Sheets

Related U.S. Application Data on Jun. 26, 2012, provisional application No. 61/767,545, filed on Feb. 21, 2013.

(51) Int. Cl.

| | |
|---|---|
| *H01M 4/36* | (2006.01) |
| *H01M 4/38* | (2006.01) |
| *H01M 4/13* | (2010.01) |
| *H01M 4/76* | (2006.01) |
| *H01M 12/08* | (2006.01) |
| *H01M 4/02* | (2006.01) |
| *H01M 10/0525* | (2010.01) |

(52) U.S. Cl.
CPC ............ *H01M 4/483* (2013.01); *H01M 4/76* (2013.01); *H01M 12/08* (2013.01); *H01M 10/0525* (2013.01); *H01M 2004/021* (2013.01); *H01M 2004/028* (2013.01); *Y02E 60/128* (2013.01)

(56) References Cited

U.S. PATENT DOCUMENTS

| | | | | |
|---|---|---|---|---|
| 2011/0165475 | A1* | 7/2011 | Drews | H01M 12/06 |
| | | | | 429/403 |
| 2012/0003529 | A1 | 1/2012 | Yamakaji | |
| 2012/0074908 | A1* | 3/2012 | Rolison | H01M 12/06 |
| | | | | 320/127 |

OTHER PUBLICATIONS

Cheng et al., Metal—air batteries: from oxygen reduction electrochemistry to cathode catalysts, Chem. Soc. Rev., 2012, 41, 2172-2192; 22 pages total.*
Song et al., "Nanostructured electrodes for lithium-ion and lithium-air batteries: the latest developments, challenges, and perspectives", Materials Science and Engineering R 72 (2011) 203-252; 50 pages total.*
Liu et al. "Heterogeneous nanostructured electrode materials for electrochemical energy storage", Chem. Commun., 2011, 47, 1384-1404; 22 pages total.*
Wu et al., "Nanostructured metal oxide-based materials as advanced anodes for lithium-ion batteries", Nanoscale, 2012, 4, 2526-2542; 17 pages total.*
Jin et al., "Titanium Containing $\gamma\_$-$MnO_2$ (TM)Hollow Spheres: One-Step Synthesis and Catalytic Activities in Li/Air Batteries and Oxidative Chemical Reactions", Adv. Funct. Mater. 2010, 22, 3373-3382; 10 pages total.*
Liu et al, "A Yolk-Shell Design for Stabilized and Scalable Li-Ion Battery Alloy Anodes," NANO Letters, Apr. 2012, pp. A-G, American Chemical Society, USA (7 pages).
Liu et al, "Supporting Information—A Yolk-Shell Design for Stabilized and Scalable Li-Ion Battery Alloy Anodes," NANO Letters, Apr. 2012, pp. A-G, American Chemical Society, USA (8 pages).
International Search Report and Written Opinion corresponding to PCT Application No. PCT/US2013/031586, dated Feb. 5, 2014 (13 pages).

* cited by examiner

METAL/OXYGEN BATTERY WITH INTERNAL OXYGEN RESERVOIR

This application claims the benefit of U.S. Provisional Application No. 61/656,862 filed Jun. 7, 2012, and U.S. Provisional Application No. 61/664,265 filed Jun. 26, 2012, and U.S. Provisional Application No. 61/767,545, filed Feb. 21, 2013, the entire contents of which are each herein incorporated by reference.

TECHNICAL FIELD

This disclosure relates to batteries and more particularly to metal/oxygen based batteries.

BACKGROUND

Rechargeable lithium-ion batteries are attractive energy storage systems for portable electronics and electric and hybrid-electric vehicles because of their high specific energy compared to other electrochemical energy storage devices. As discussed more fully below, a typical Li-ion cell contains a negative electrode, a positive electrode, and a separator region between the negative and positive electrodes. Both electrodes contain active materials that insert or react with lithium reversibly. In some cases the negative electrode may include lithium metal, which can be electrochemically dissolved and deposited reversibly. The separator contains an electrolyte with a lithium cation, and serves as a physical barrier between the electrodes such that none of the electrodes are electronically connected within the cell.

Typically, during charging, there is generation of electrons at the positive electrode and consumption of an equal amount of electrons at the negative electrode, and these electrons are transferred via an external circuit. In the ideal charging of the cell, these electrons are generated at the positive electrode because there is extraction via oxidation of lithium ions from the active material of the positive electrode, and the electrons are consumed at the negative electrode because there is reduction of lithium ions into the active material of the negative electrode. During discharging, the exact opposite reactions occur.

When high-specific-capacity negative electrodes such as a metal are used in a battery, the maximum benefit of the capacity increase over conventional systems is realized when a high-capacity positive electrode active material is also used. For example, conventional lithium-intercalating oxides (e.g., $LiCoO_2$, $LiNi_{0.8}Co_{0.15}Al_{0.05}O_2$, $Li_{1.1}Ni_{0.3}Co_{0.3}Mn_{0.3}O_2$) are typically limited to a theoretical capacity of ~280 mAh/g (based on the mass of the lithiated oxide) and a practical capacity of 180 to 250 mAh/g, which is quite low compared to the specific capacity of lithium metal, 3863 mAh/g. The highest theoretical capacity achievable for a lithium-ion positive electrode is 1794 mAh/g (based on the mass of the lithiated material), for $Li_2O$. Other high-capacity materials include $BiF_3$ (303 mAh/g, lithiated), $FeF_3$ (712 mAh/g, lithiated), and others. Unfortunately, all of these materials react with lithium at a lower voltage compared to conventional oxide positive electrodes, hence limiting the theoretical specific energy. Nonetheless, the theoretical specific energies are still very high (>800 Wh/kg, compared to a maximum of ~500 Wh/kg for a cell with lithium negative and conventional oxide positive electrodes, which may enable an electric vehicle to approach a range of 300 miles or more on a single charge.

Figure 1:
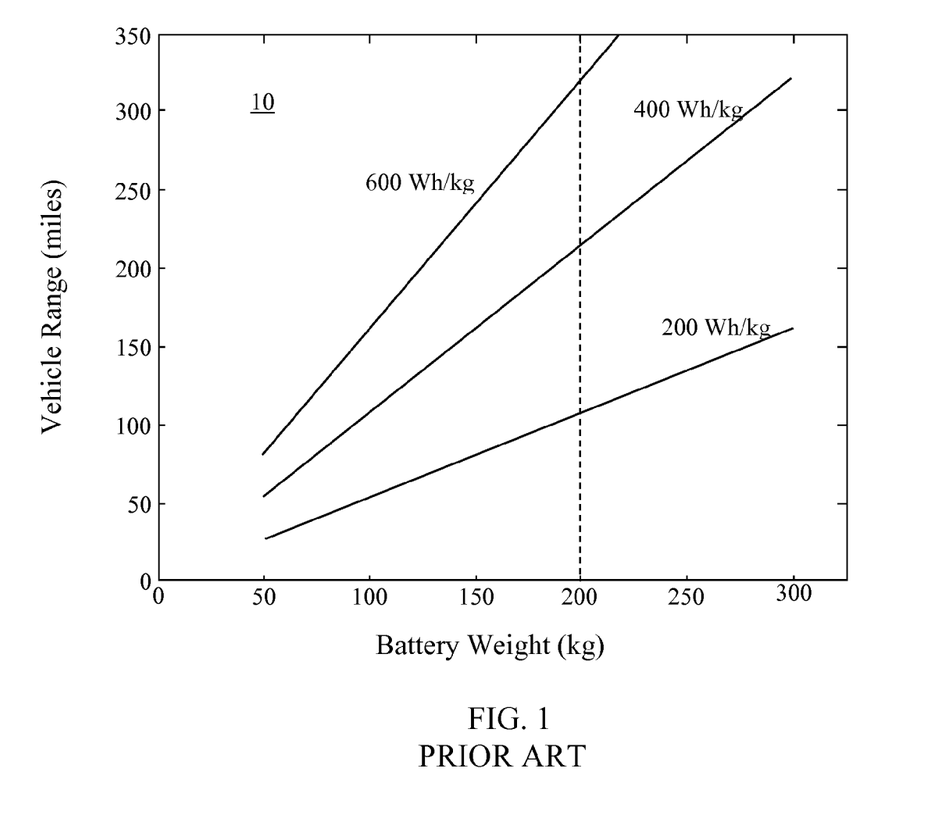
FIG. 1 depicts a plot showing the relationship between battery weight and vehicular range for various specific energies.

FIG. 1 depicts a chart 10 showing the range achievable for a vehicle using battery packs of different specific energies versus the weight of the battery pack. In the chart 10, the specific energies are for an entire cell, including cell packaging weight, assuming a 50% weight increase for forming a battery pack from a particular set of cells. The U.S. Department of Energy has established a weight limit of 200 kg for a battery pack that is located within a vehicle. Accordingly, only a battery pack with about 600 Wh/kg or more can achieve a range of 300 miles.

Figure 2:
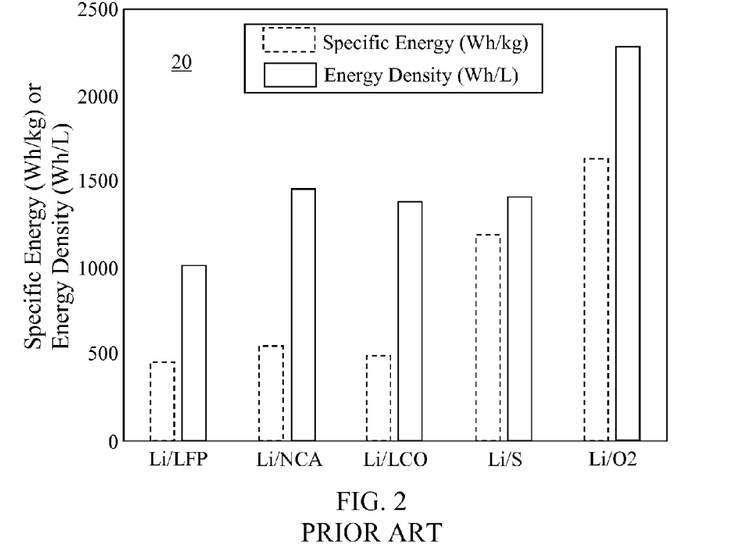
FIG. 2 depicts a chart of the specific energy and energy density of various lithium-based cells.

Various lithium-based chemistries have been investigated for use in various applications including in vehicles. FIG. 2 depicts a chart 20 which identifies the specific energy and energy density of various lithium-based chemistries. In the chart 20, only the weight of the active materials, current collectors, binders, separator, and other inert material of the battery cells are included. The packaging weight, such as tabs, the cell can, etc., are not included. As is evident from the chart 20, lithium/oxygen batteries, even allowing for packaging weight, are capable of providing a specific energy >600 Wh/kg and thus have the potential to enable driving ranges of electric vehicles of more than 300 miles without recharging, at a similar cost to typical lithium ion batteries. While lithium/oxygen cells have been demonstrated in controlled laboratory environments, a number of issues remain before full commercial introduction of a lithium/oxygen cell is viable as discussed further below.

Figure 3:
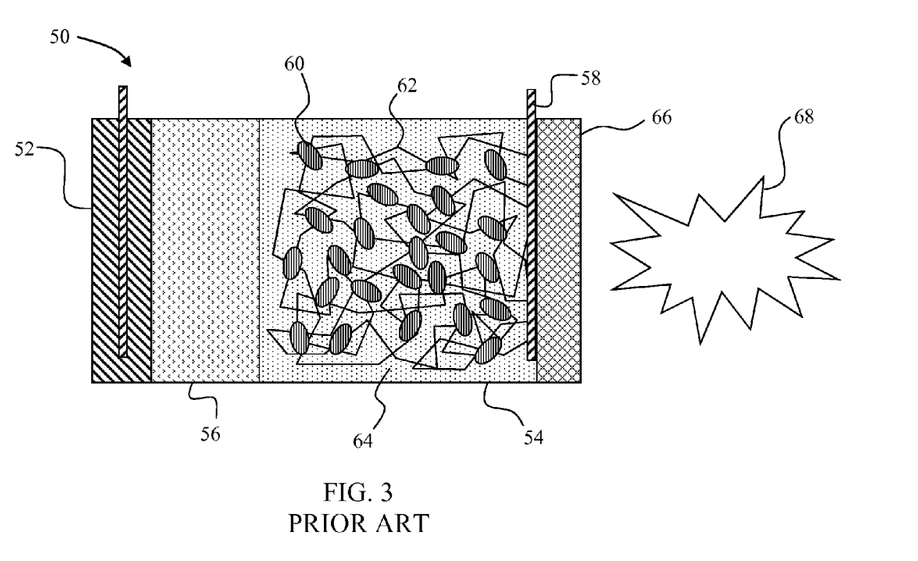
FIG. 3 depicts a prior art lithium-oxygen (Li/oxygen) cell including two electrodes, a separator, and an electrolyte.

A typical lithium/oxygen electrochemical cell 50 is depicted in FIG. 3. The cell 50 includes a negative electrode 52, a positive electrode 54, a porous separator 56, and a current collector 58. The negative electrode 52 is typically metallic lithium. The positive electrode 54 includes electrode particles such as particles 60 possibly coated in a catalyst material (such as Au or Pt) and suspended in a porous, electrically conductive matrix 62. An electrolyte solution 64 containing a salt such as $LiPF_6$ dissolved in an organic solvent such as dimethyl ether or $CH_3CN$ permeates both the porous separator 56 and the positive electrode 54. The $LiPF_6$ provides the electrolyte with an adequate conductivity which reduces the internal electrical resistance of the cell 50 to allow a high power.

A portion of the positive electrode 52 is enclosed by a barrier 66. The barrier 66 in FIG. 3 is configured to allow oxygen from an external source 68 to enter the positive electrode 54 while filtering undesired components such as gases and fluids. The wetting properties of the positive electrode 54 prevent the electrolyte 64 from leaking out of the positive electrode 54. Alternatively, the removal of contaminants from an external source of oxygen, and the retention of cell components such as volatile electrolyte, may be carried out separately from the individual cells. Oxygen from the external source 68 enters the positive electrode 54 through the barrier 66 while the cell 50 discharges and oxygen exits the positive electrode 54 through the barrier 66 as the cell 50 is charged. In operation, as the cell 50 discharges, oxygen and lithium ions are believed to combine to form a discharge product $Li_2O_2$ or $Li_2O$ in accordance with the following relationship:

The positive electrode 54 in a typical cell 50 is a lightweight, electrically conductive material which has a porosity of greater than 80% to allow the formation and deposition/storage of $Li_2O_2$ in the cathode volume. The ability to deposit the $Li_2O_2$ directly determines the maximum capacity of the cell. In order to realize a battery system with a specific energy of 600 Wh/kg or greater, a plate with a thickness of 100 μm must have a capacity of about 20 mAh/cm².

Materials which provide the needed porosity include carbon black, graphite, carbon fibers, carbon nanotubes, and other non-carbon materials. There is evidence that each of these carbon structures undergo an oxidation process during charging of the cell, due at least in part to the harsh environment in the cell (pure oxygen, superoxide and peroxide ions, formation of solid lithium peroxide on the cathode surface, and electrochemical oxidation potentials of >3V (vs. Li/Li+)).

A number of investigations into the problems associated with Li-oxygen batteries have been conducted as reported, for example, by Beattie, S., D. Manolescu, and S. Blair, "High-Capacity Lithium-Air Cathodes," *Journal of the Electrochemical Society,* 2009. 156: p. A44, Kumar, B., et al., "A Solid-State, Rechargeable, Long Cycle Life Lithium-Air Battery," *Journal of the Electrochemical Society,* 2010. 157: p. A50, Read, J., "Characterization of the lithium/oxygen organic electrolyte battery," *Journal of the Electrochemical Society,* 2002. 149: p. A1190, Read, J., et al., "Oxygen transport properties of organic electrolytes and performance of lithium/oxygen battery," *Journal of the Electrochemical Society,* 2003. 150: p. A1351, Yang, X and Y. Xia, "The effect of oxygen pressures on the electrochemical profile of lithium/oxygen battery," *Journal of Solid State Electrochemistry*: p. 1-6, and Ogasawara, T., et al., "Rechargeable $Li_2O_2$ Electrode for Lithium Batteries," *Journal of the American Chemical Society,* 2006. 128(4): p. 1390-1393.

While some issues have been investigated, several challenges remain to be addressed for lithium-oxygen batteries. These challenges include limiting dendrite formation at the lithium metal surface, protecting the lithium metal (and possibly other materials) from moisture and other potentially harmful components of air (if the oxygen is obtained from the air), designing a system that achieves acceptable specific energy and specific power levels, reducing the hysteresis between the charge and discharge voltages (which limits the round-trip energy efficiency), and improving the number of cycles over which the system can be cycled reversibly.

Figure 4:
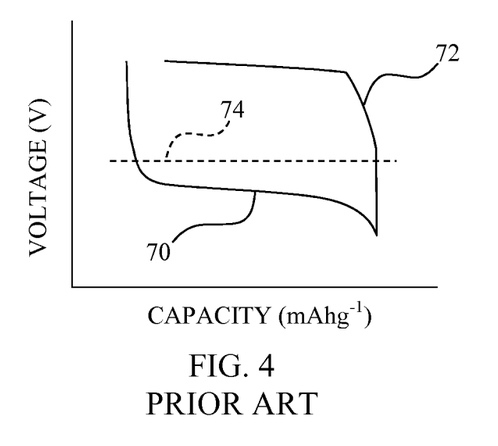
FIG. 4 depicts a discharge and charge curve for a typical Li/oxygen electrochemical cell.

The limit of round trip efficiency occurs due to an apparent voltage hysteresis as depicted in FIG. 4. In FIG. 4, the discharge voltage 70 (approximately 2.5 to 3 V vs. Li/Li+) is much lower than the charge voltage 72 (approximately 4 to 4.5 V vs. Li/Li+). The equilibrium voltage 74 (or open-circuit potential) of the lithium/oxygen system is approximately 3 V. Hence, the voltage hysteresis is not only large, but also very asymmetric.

The large over-potential during charge may be due to a number of causes. For example, reaction between the $Li_2O_2$ and the conducting matrix 62 may form an insulating film between the two materials. Additionally, there may be poor contact between the solid discharge products $Li_2O_2$ or $Li_2O$ and the electronically conducting matrix 62 of the positive electrode 54. Poor contact may result from oxidation of the discharge product directly adjacent to the conducting matrix 62 during charge, leaving a gap between the solid discharge product and the matrix 52.

Figure 5:
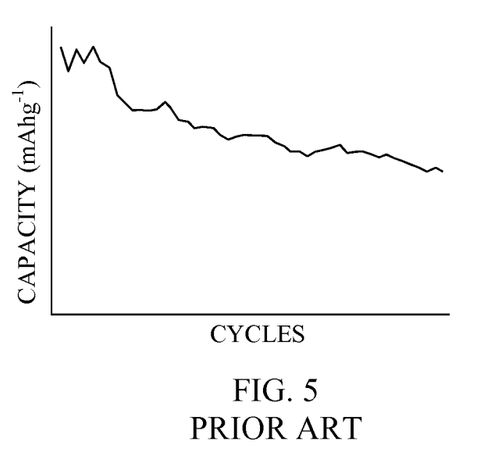
FIG. 5 depicts a plot showing decay of the discharge capacity for a typical Li/oxygen electrochemical cell over a number of cycles.

Another mechanism resulting in poor contact between the solid discharge product and the matrix 62 is complete disconnection of the solid discharge product from the conducting matrix 62. Complete disconnection of the solid discharge product from the conducting matrix 62 may result from fracturing, flaking, or movement of solid discharge product particles due to mechanical stresses that are generated during charge/discharge of the cell. Complete disconnection may contribute to the capacity decay observed for most lithium/oxygen cells. By way of example, FIG. 5 depicts the discharge capacity of a typical Li/oxygen cell over a period of charge/discharge cycles.

Other physical processes which cause voltage drops within an electrochemical cell, and thereby lower energy efficiency and power output, include mass-transfer limitations at high current densities. The transport properties of aqueous electrolytes are typically better than nonaqueous electrolytes, but in each case mass-transport effects can limit the thickness of the various regions within the cell, including the cathode. Reactions among $O_2$ and other metals may also be carried out in various media.

What is needed therefore is a metal/oxygen battery having a dedicated oxygen reservoir. It would be beneficial is such a device avoided the cost, complexity, and loss of energy efficiency associated with the use of an external, mechanical oxygen compressor.

SUMMARY

An electrochemical cell in various embodiments includes particles of $Li_2O_2$ (or $Li_2O$) which are coated conformally with a material that provides transport of lithium ions (or other metal ions) and electrons to and from the core. When the cell is charged, the core material is delithiated, leaving pressurized oxygen gas inside the core. The lithium is transported across the shell into a lithium-conducting electrolyte, which carries the lithium ions to or toward the negative electrode of the cell. The electrons are transported through the conductive shell to an electronically conductive matrix that connects all of the active particles to a current collector.

In another embodiment, an electrochemical cell includes a negative electrode, a positive electrode spaced apart from the negative electrode, a separator positioned between the negative electrode and the positive electrode; and an active material particle within the positive electrode, the active material particle including an outer shell defining a core with a substantially constant volume and including a form of oxygen, the outer shell substantially impervious to oxygen and pervious to lithium.

In a further embodiment, an electrochemical cell includes a negative electrode, a positive electrode spaced apart from the negative electrode, a separator positioned between the negative electrode and the positive electrode, and an active material particle within the positive electrode, the active material particle including an outer shell defining a core space and configured such that when the positive electrode is in a fully lithiated state, the core space includes $Li_2O_2$, and when the positive electrode is in a delithiated state, the core space includes $O_2$.

There are many advantages of this system over state of the art. For example, in various embodiments it provides separation of electrolyte from $O_2$, $Li_2O_2$, and $O_2$—, which are known to decompose the electrolyte. The disclosed system in various embodiments exhibits no volume change in the cathode, as in a conventional Li/air cell. Therefore, the porosity of the cathode remains relatively constant, as should the effective electrolyte transport properties. Furthermore, there is reduced risk of losing connection between particles because of volume change.

In various embodiments, high volume and weight fraction of $Li_2O_2$ are engineered. Consequently, high area-specific capacity and high cell energy density can be realized relative to state of the art systems.

In various embodiments a highly conductive electrode is provided via electronically conductive coating.

In various embodiments a flooded electrode design is incorporated without the complications inherent in three-phase electrodes.

In various embodiments oxygen is not required to be separated from air when supplying oxygen to the cell.

In various embodiments the system is not an open system, where electrolyte evaporation can result in severe cell degradation over time.

DETAILED DESCRIPTION

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art to which this disclosure pertains.

Figure 6:
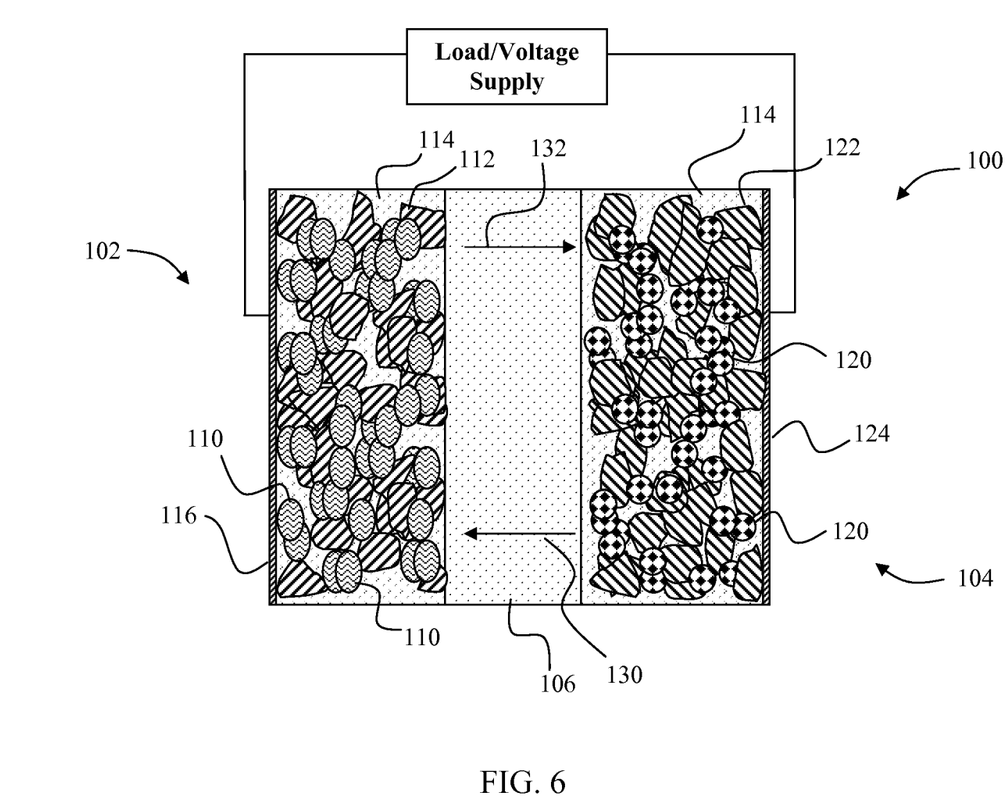
FIG. 6 depicts a schematic of a battery system including an electrochemical cell with an internal oxygen reservoir in accordance with principles of the present disclosure.

FIG. 6 depicts a lithium-ion cell 100, which includes a negative electrode 102, a positive electrode 104, a separator region 106 between the negative electrode 102 and the positive electrode 104. The negative electrode 102 includes active materials 110 into which lithium can be inserted, inert materials 112, electrolyte 114 and a current collector 116.

The negative electrode 102 of FIG. 6 may be provided in various forms. In one embodiment, the negative electrode 102 includes a porous, electronically conducting framework (e.g., graphite particles mixed with binder). Incorporation of Li metal is desired since the Li metal affords a higher specific energy than graphite. The electrolyte 114 fills the pores of the negative electrode 102 in the embodiment of FIG. 6 and includes a lithium salt. In some embodiments, the electrolyte 114 includes one or more solvents. In some embodiments, the electrolyte includes other additives, and optionally dissolved oxygen.

The positive electrode 104 includes active material particles 120 into which lithium can be inserted, inert materials 122, the electrolyte 114 and a current collector 124. The separator region 106 includes the electrolyte 114 and serves as a physical barrier between the negative electrode 102 and the positive electrode 104 so that the electrodes are not electronically connected within the cell 100.

Under normal conditions, the lithium-ion cell 100 operates in a manner similar to the lithium-ion battery cell disclosed in U.S. Pat. No. 7,726,975, which issued on Jun. 1, 2010, the contents of which are herein incorporated in their entirety by reference. In general, electrons are generated at the positive electrode 104 during charging and an equal amount of electrons are consumed at the negative electrode 102 as lithium and electrons move in the direction of the arrow 130 of FIG. 1. In the ideal charging of the cell 100, the electrons are generated at the positive electrode 104 because there is extraction via oxidation of lithium ions from the active material 120 of the positive electrode 104, and the electrons are consumed at the negative electrode 102 because there is reduction of lithium ions into the active material 110 of the negative electrode. During discharging, the reactions are reversed, with lithium and electrons moving in the direction of the arrow 132.

Figure 7:
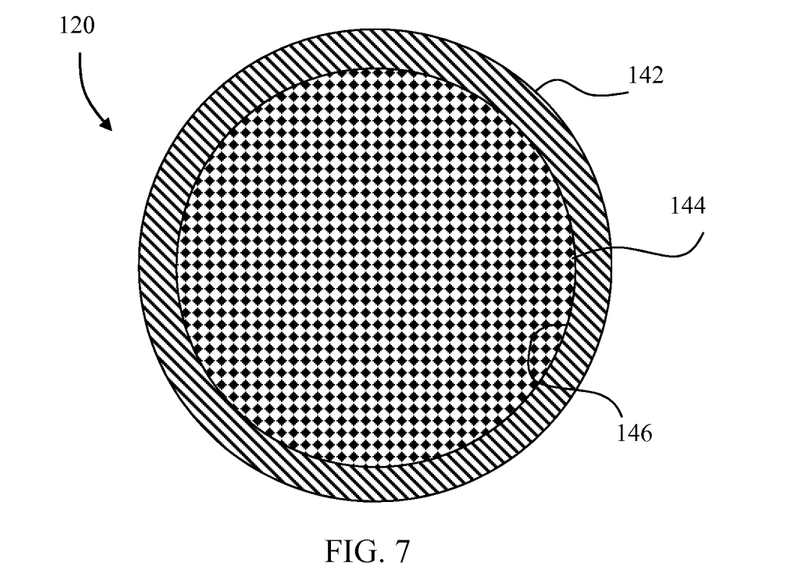
FIG. 7 depicts a schematic cross-sectional view of an active material particle of FIG. 6 in a lithiated state.

FIG. 7 depicts a schematic cross-sectional view of one of the active material particles 120. The active material particle 120 includes an outer shell 142 and a material 144 in the form of $Li_2O_2$. The active material particle 120 is shown in a lithiated state. In the embodiment of FIG. 7, the material 144 fully fills the outer shell 142 in the lithiated state. In some embodiments, the material 144 does not fully fill the outer shell 142.

The outer shell 142 in various embodiments is formed from various oxides ($SiO_2$, $Al_2O_3$, $ZrO_2$, $TiO_2$, $Li_4Ti_5O_{12}$, etc.). In further embodiments, the outer shell 142 includes metals and/or sulfides (e.g., $TiS_2$). The active material shell in various embodiments include a form of carbon, $TiS_2$, $Li_4Ti_5O_{12}$, $TiO_2$, $Li_xM_yA_z$, where "M" can include any or a combination of Fe, Mn, Ni, Co, Mg, Mo, Mb, Al, or other metals, and "A" can include any or a combination of O, P, N, S, Si, B, F, and C. Other variations are possible. Acceptable outer shell materials include those with good lithium and/or electron conductivity. These properties typically become less of a factor in embodiments with very thin coatings.

The core space 146 defined by the outer shell 142 (the core space 146 is coextensive with the material 144 in FIG. 7) is preferably spherical, but in other embodiments is cylindrical, prismatic, or some other shape. The diameter of the core in one embodiment is less than 10 microns, and preferably less than 200 nm. The thickness of the shell 142 is preferably less than 1 micron, and more preferably less than 20 nm. The thickness should preferably be less than 10% of the core space diameter.

Figure 8:
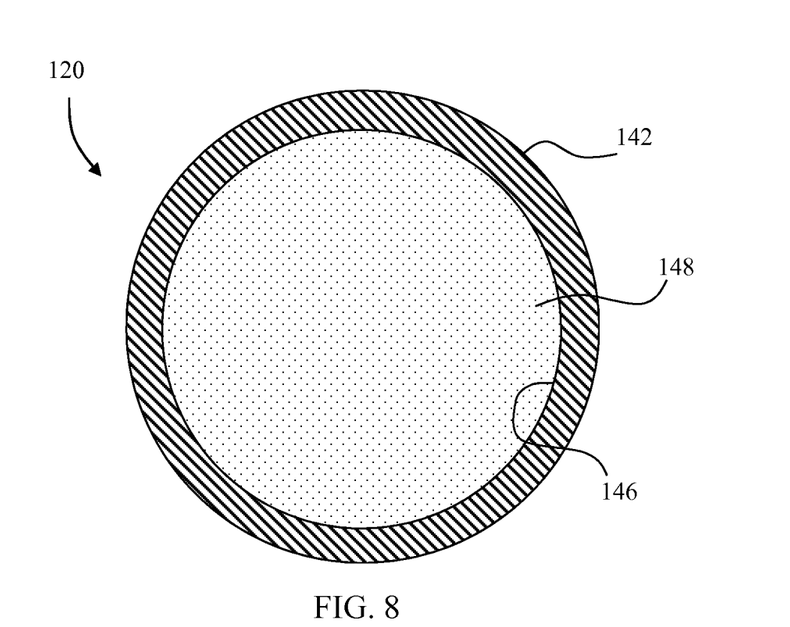
FIG. 8 depicts the active material particle of FIG. 7 in a delithiated state.

FIG. 8 depicts the active material particle 120 in a fully delithiated state. In the fully delithiated state, the core space 146 defined by the outer shell 142 is substantially identical to the core space 146 defined by the outer shell 142 in the lithiated state of FIG. 7. In contrast to the lithiated state, however, $O_2$ 148 substantially fills the internal area (core space) of the outer shell 142. Thus, as the positive electrode 104 is delithiated, the volume of the core space 146 remains substantially constant.

When the active material particle 120 is delithiated (i.e., during battery charge), the $O_2$ 148 is left behind inside the shell 142. Because of differences in oxygen density in the gas or liquid phase vs. the condensed $Li_2O_2$ phase, the pressure of the residual $O_2$ 106 can be quite high (>1000 bar when fully delithiated) since the volume of the core space 146 remains substantially constant. Therefore, the outer shell 142 is provided with sufficient mechanical strength to retain a high pressure gas in the delithiated state. Thus, while some stretching of the active material particle 120 may occur, such stretching is minimized.

In general, the cell 100 is assembled in the discharged state, i.e., with lithium peroxide in the positive electrode ("cathode"). When the cell is charged, the lithium is transported to the negative electrode ("anode"), leaving pressurized oxygen inside the coating of the active particles 120 in the positive electrode.

In one embodiment, the active material particle 120 is provided with a void area within the outer shell 102 in the lithiated state. This lowers the energy density of the active material particle 120, but also lowers the maximum pressure inside the outer shell 142 when the active material particle 120 is fully delithiated. For instance, including a 50% void volume would result in roughly 50% reduction in capacity, but also would lower the maximum pressure below 50% (i.e., below 1000 bar). Such a void volume in different embodiments is in the form of pores or cracks (either percolating or nonpercolating) inside the $Li_2O_2$ phase, in other embodiments, the $Li_2O_2$ is fully dense, but in contact with a void volume inside the shell. The $Li_2O_2$ in further embodiments is formed as a hollow shell itself, with a large void volume inside, and the mechanically stable coating is applied on top of the $Li_2O_2$ shell.

Various approaches are used in different embodiments to provide the outer shell 142. Atomic layer deposition (ALD) is a potentially low-temperature process that can be used to conformally deposit dense films one monolayer at a time on arbitrarily shaped surfaces, including nanoparticles. For example, $Al_2O_3$ coatings have been applied on Si substrates at temperatures as low as 33° C. (Groner et al, *Chem. Mater.* 2004, 16, 639-645). $Al_2O_3$, while electronically insulating, has been shown to form a stable coating on battery electrode materials (graphite and lithium transition-metal oxides). If it is thin enough, lithium and electron transport rates through the film are sufficient to enable cycling at high current densities. In other embodiments, $SiO_2$ is applied as a surface coating at room temperature, in a manner similar to that discussed by Ferguson et al., "ALD of $SiO_2$ at Room Temperature Using TEOS and $H_2O$ with $NH_3$ as the Catalyst", *Journal of The Electrochemical Society* 151 (8), G528-G535. In certain embodiments, $SiO_2$ may have better Li and electron conduction than $Al_2O_3$.

In another embodiment, small shells of mechanically tough coating material that contain small openings are formed. $Li_2O_2$ is melted or sublimed and introduced into the open space of the coating, up to a desired volume fraction. Thereafter, the shell is "capped" via a chemical process, possibly even at high temperature. This approach avoids many problems associated with the low melting temperature of $Li_2O_2$. In a further embodiment, Li is introduced as described above, and then oxidized by exposure to an oxygen environment, prior to "capping".

While the foregoing processes have been discussed in detail, other forming processes are also used in other embodiments. Such processes include chemical vapor deposition (CVD), physical vapor deposition, sputtering, molecular beam epitaxy, spin coating or spin casting, plasma enhanced CVD, electroplating, thermal evaporation, pulsed laser deposition, cathodic arc deposition, and electrospray deposition. In addition, a sequence of steps, including exposure to chemical reactants and or elevated temperature, are employed in some embodiments in making coated $Li_2O_2$ powders.

The above described active material particle may be incorporated into various battery chemistries and various counter electrodes including, Li metal, graphite, Si, $Li_4Ti_5O_{12}$, etc.

Additionally, many different electrolytes can be used, including conventional organic liquid electrolytes, ionic liquids, solid electrolytes (polymer and/or ceramic), and even water. In some embodiments, a solid electrolyte that transports Li ions but not electrons is located between the anode and cathode compartments. For instance, this enables use of a lithium metal negative electrode and an aqueous positive electrode that contains the coated $Li_2O_2$ particles.

The positive electrode, which contains the coated $Li_2O_2$ active material particles, may also contain inactive components such as binder, conductive additive (e.g., carbon black, carbon fibers, graphite).

The composite positive electrode is preferably porous, containing the coated $Li_2O_2$, electrolyte, and inactive components, and is manufactured such that all coated $Li_2O_2$ particles are electronically connected to a current collector (e.g., metal grid or sheet).

A battery including the active material particle in some embodiments, especially those including a Li metal, contains elastic seals to accommodate volume change in the negative electrode.

Additionally, the positive electrode may contain active materials in addition to the $Li_2O_2$ active material particles to enhance the battery power capability and/or safety, or to decrease the battery cost.

The above described battery is useful in the powertrain of an electric vehicle (land, air, or sea), for stationary storage of residential energy or for accommodating fluctuations in supply and demand on the electrical grid, or in portable electronics. Uses are not limited to these applications.

While the invention has been illustrated and described in detail in the drawings and foregoing description, the same should be considered as illustrative and not restrictive in character. Only the preferred embodiments have been presented and all changes, modifications and further applications that come within the spirit of the invention are desired to be protected.

The invention claimed is:

1. An electrochemical cell, comprising:
   a negative electrode;
   a positive electrode spaced apart from the negative electrode;
   a separator positioned between the negative electrode and the positive electrode; and
   an active material particle within the positive electrode, the active material particle including an outer shell defining a core space and configured such that when the positive electrode is in a fully lithiated state, the core space includes $Li_2O_2$ and no electrolyte, and when the positive electrode is in a delithiated state, the core space includes $O_2$ and no electrolyte.

2. The electrochemical cell of claim 1, wherein the volume of the core space when the positive electrode is in a fully delithiated state is substantially the same as the volume of the core space when the positive electrode is in a fully lithiated state.

3. The electrochemical cell of claim 2, wherein the volume of $Li_2O_2$ in the core space when the positive electrode is in a fully lithiated state is substantially the same as the volume of the core space.

4. The electrochemical cell of claim 2, wherein the volume of $Li_2O_2$ in the core space when the positive electrode is in a fully lithiated state is less than the volume of the core space.

5. The electrochemical cell of claim 1, wherein:
the active material particle has a core space diameter;
the outer shell has a thickness; and
the thickness is less than about 10% of the core space diameter.

6. The electrochemical cell of claim 5, wherein the core space diameter is less than about 10 microns.

7. The electrochemical cell of claim 5, wherein the core space diameter is less than about 200 nanometers.

8. The electrochemical cell of claim 5, wherein the thickness is less than about 1 micron.

9. The electrochemical cell of claim 8, wherein the thickness is less than about 20 nanometers.

10. The electrochemical cell of claim 1, wherein the outer shell comprises an oxide material.

11. The electrochemical cell of claim 1, wherein the outer shell comprises a sulfide material.

12. The electrochemical cell of claim 1, wherein the outer shell is substantially impervious to oxygen and pervious to lithium.

13. The electrochemical cell of claim 1, wherein the active material particle is one of a plurality of active material particles within the positive electrode, each of the plurality of active material particles including a respective outer shell defining a respective core space and configured such that when the positive electrode is in a fully lithiated state, the respective core space includes $Li_2O_2$ and no electrolyte, and when the positive electrode is in a delithiated state, the respective core space includes $O_2$ and no electrolyte.

14. The electrochemical cell of claim 13, wherein each of the respective outer shells is substantially spherical.

\* \* \* \* \*